US009252461B2

(12) United States Patent
Lu et al.

(10) Patent No.: US 9,252,461 B2
(45) Date of Patent: Feb. 2, 2016

(54) HYBRID ENERGY STORAGE DEVICES HAVING SODIUM

(71) Applicant: BATTELLE MEMORIAL INSTITUTE, Richland, WA (US)

(72) Inventors: Xiaochuan Lu, Richland, WA (US); Jin Yong Kim, Richland, WA (US); Guosheng Li, Richland, WA (US); John P. Lemmon, Kennewick, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 199 days.

(21) Appl. No.: 13/948,857

(22) Filed: Jul. 23, 2013

(65) Prior Publication Data

US 2014/0023903 A1   Jan. 23, 2014

Related U.S. Application Data

(60) Provisional application No. 61/674,609, filed on Jul. 23, 2012.

(51) Int. Cl.
*H01M 10/39* (2006.01)

(52) U.S. Cl.
CPC ........ *H01M 10/3909* (2013.01); *H01M 10/399* (2013.01)

(58) Field of Classification Search
CPC .......... H01M 10/3909; H01M 10/399
See application file for complete search history.

(56) References Cited

U.S. PATENT DOCUMENTS 5,536,593 A * 7/1996 Redey et al. ................. 429/103
5,962,160 A * 10/1999 Oyama et al. ............... 429/104

OTHER PUBLICATIONS

Ryu, Hosuk. "Discharge reaction mechanism or room temperature sodium-sulfur battery with tetra ethylene glycol dimethyl ether liquid electrolyte," Journal of Power Sources, 2011, 5186-5190 pps., vol. 196, Elsevier, Sydney, Australia.*
Rhodes, C., "Sodium—Sulfur—Nickel Chloride Electro-Chemical Energy Storage," Online Article, http://www.xylenepower.com/Na-S-NiCl2%20Electro-Chemical%20Cell.htm, Xylene Power Ltd., Aug. 3, 2011.
Ryu, Hosuk, "Discharge reaction mechanism of room-temperature sodium—sulfur battery with tetra ethylene glycol dimethyl ether liquid electrolyte," Journal of Power Sources, 2011, 5186-5190 pps., vol. 196, Elsevier, Sydney, Australia.

* cited by examiner

*Primary Examiner* — Brittany Raymond
(74) *Attorney, Agent, or Firm* — Klarquist Sparkman, LLP

(57) ABSTRACT

Sodium energy storage devices employing aspects of both ZEBRA batteries and traditional Na—S batteries can perform better than either battery alone. The hybrid energy storage devices described herein can include a sodium anode, a molten sodium salt catholyte, and a positive electrode that has active species containing sulfur. Additional active species can include a transition metal source and NaCl. As a product of the energy discharge process, $Na_2S_x$ forms in which x is less than three.

20 Claims, 5 Drawing Sheets

HYBRID ENERGY STORAGE DEVICES HAVING SODIUM

CROSS-REFERENCE TO RELATED APPLICATIONS

This invention claims priority from U.S. Provisional Patent Application No. 61/674,609, entitled Hybrid Energy Storage Devices Having Sodium, filed Jul. 23, 2012. The application is incorporated herein by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Sodium-beta alumina batteries (NBBs), based on a molten Na anode and $\beta''$-$Al_2O_3$ solid electrolyte (BASE), have recently gained increasing interests as an electrical energy storage device for renewable integration and grid applications, along with commercial or fleet transportation. There are mainly two types of NBBs that have been widely studied, based on the particular cathode materials. One is a sodium-sulfur (Na—S) battery of which the cathode is molten sulfur, following the cell reaction:

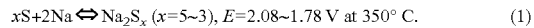

$$xS+2Na \Leftrightarrow Na_2S_x \ (x=5\sim3), E=2.08\sim1.78 \text{ V at } 350°\text{ C}. \quad (1)$$

Na—S chemistry has a high theoretical energy density (~760 Wh/kg), high energy efficiency and acceptable cycle life. The materials of the sodium-sulfur battery (i.e., alumina, sulfur and sodium) are relatively non-toxic, inexpensive and readily available. The combination of these features makes it extremely attractive compared to other technologies for grid storage such as lithium-ion, Ni-metal hydride or Pb-acid batteries. The traditional Na—S battery uses a thick solid $\beta''$-$Al_2O_3$ membrane (>1 mm) as electrolyte to separate the sulfur cathode and sodium anode, and operate at high temperatures (300~350° C.). The high temperature is necessary for both the BASE and cathode constituents (i.e., sodium polysulfides) to achieve satisfactory electrochemical activities. However, the drawbacks of Na—S battery can include: 1) intrinsic corrosive behavior of polysulfide melts, which limits material selections for both cathode current collector and battery casing; 2) high operating temperature and open circuit cell failure mode. If the BASE is broken during battery operation, molten sulfides come in direct contact with molten sodium and the reactions between them are inherently vigorous. This can potentially result in a fire and even explosion since the battery operation temperature is close to boiling point of sulfur (440° C.). Neighboring cells can also be affected by such an event and result in severe power loss due to open circuit.

The second type of NBB is the ZEBRA battery, in which solid transition metal halides, which can include $NiCl_2$, $FeCl_2$ and $ZnCl_2$, are used as active materials in the cathode. The ZEBRA battery typically needs a molten secondary electrolyte (i.e., $NaAlCl_4$) in the cathode so as to ensure facile sodium ion transport between the BASE and solid cathode materials. The electrochemical reaction of Na—$NiCl_2$ cells is as follows:

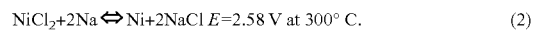

$$NiCl_2+2Na \Leftrightarrow Ni+2NaCl \ E=2.58 \text{ V at } 300°\text{ C}. \quad (2)$$

The ZEBRA battery exhibits a number of advantages over the Na—S battery, which include higher voltage, facile assembly in discharged state, less corrosive nature of cathode materials, lower operating temperature, safer cell failure mode, and better tolerance against overcharging. One notable disadvantage of the current ZEBRA technologies is the lower energy density compared to Na—S battery. Accordingly, a need exists for sodium energy storage devices exhibiting at least some advantages of both ZEBRA and Na—S technologies.

SUMMARY

This document describes hybrid sodium energy storage devices employing aspects of both ZEBRA batteries and traditional Na—S batteries. The hybrid sodium energy storage devices include a catholyte comprising a molten sodium salt and a positive electrode that has active species comprising sulfur. Additional active species can further include NaCl and a transition metal source. The sulfur is present in amounts greater than is used when sulfur is employed as a mere additive. The resultant energy storage devices exhibit lower operating temperatures, higher energy density, better cycle life, and improved safety compared to Na—S and/or ZEBRA batteries. This can make them useful in a variety of applications including, but not limited to, renewable integration and grid applications as well as commercial and fleet transportation.

In one embodiment, the energy storage device has a negative electrode comprising sodium, a positive electrode having an active species comprising sulfur, and a catholyte comprising a molten sodium salt. A beta-alumina solid electrolyte (BASE) separates the positive and negative electrodes. As a product of the energy discharge process, $Na_2S_x$ forms in which x is less than three. In traditional Na—S batteries, solid $Na_2S_x$ formation typically results in halted discharge. In preferred embodiments, an energy discharge product comprises $Na_2S$. In some embodiments, a product of the energy charge process can comprise $Na_2S_y$, wherein y is greater than or equal to 3.

According to various embodiments, the amount of active species that comprises sulfur can differ. For example, substantially 100% of the active species can comprise sulfur. An electrically conductive material can be employed as a positive current collector, but the conductive material does not participate as an active species. Examples of suitable electrically conductive materials can include, but are not limited to, carbon, graphite, graphene, transition metals, and combinations thereof. Alternatively, the active species can comprise a plurality of materials. In such cases, at least 10% of the active species comprises sulfur. Alternatively, at least 30% of the active species comprises sulfur. Preferably, at least 50% of the active species comprises sulfur. In one embodiment, the additional active species comprises a transition metal source and NaCl. The transition metal can include, but is not limited to, Ni, Cu, Fe, Zn, Ag, Mn, Co, Ti, and combinations thereof. Examples of transition metal sources can include, but are not limited to, $NiCl_2$, $CuCl_2$, $FeCl_2$, $ZnCl_2$, $AgCl$, $MnCl_2$, $CoCl_2$, $TiCl_4$, and combinations thereof.

As used herein, molten sodium salts refer to sodium containing salts that are molten at the operating temperature of the energy storage device. The salt is not necessarily always molten. For example, if the energy storage device is cooled when not operating, the sodium salt can solidify. Examples of molten sodium salts can include, but are not limited to, sodium polysulfides, sodium metal halides, and combinations thereof. In a preferred embodiment, the molten sodium salt comprises $NaAlCl_4$.

In one embodiment, the operating temperature of the energy storage devices described herein can be below 400° C. Preferably, the operating temperature is below 300° C.

The purpose of the summary provided herein is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

DESCRIPTION OF DRAWINGS

Embodiments of the invention are described below with reference to the following accompanying drawings.

DESCRIPTION

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

Furthermore, the following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
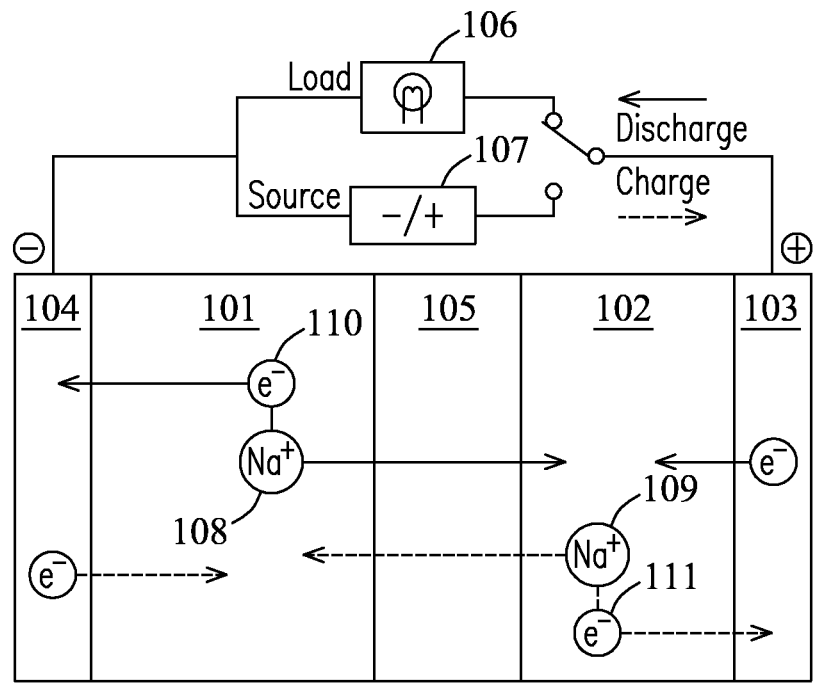
FIG. 1 is a schematic diagram conceptually depicting a sodium energy storage device having an active species comprising sulfur in the positive electrode according to embodiments of the present invention.

As described elsewhere herein, two technologies (e.g., sodium-sulfur and sodium-metal halide) have traditionally been available in sodium beta batteries. Referring to FIG. 1, embodiments described herein employ a combination of these two chemistries with a hybrid cathode 102 and an anode 101 comprising sodium. The anode and cathode are separated by BASE 105. In one example, the cathode 102 of a cell has an active species comprising $Na_2S$ and a catholyte comprising $NaAlCl_4$. In another example, the cathode 102 of a cell consisted of molten $NaAlCl_4$ as a catholyte and a mixture of Ni, NaCl and $Na_2S$ as active species. Positive and negative current collectors are depicted as elements 103 and 104, respectively. During discharge to a load 106, sodium in the anode loses electrons 110, which can be collected by the negative current collector 104. The resultant sodium ions 108 cross the BASE to the cathode 102 where they react with the sulfur containing active species and any other active species enabled by the catholyte. During charging (e.g., from a source 107), the active species is oxidized. The resultant electron 111 is collected by the positive current collector and the resultant sodium ion 109 crosses the BASE to the anode where it is reduced to form sodium. The stable reduction of sulfur in the cathodes described herein can lead to an increase in overall energy density.

Examples below are illustrative of embodiments described herein. BASE discs were fabricated using a vapor phase process as described previously. Starting powders were high purity α-$Al_2O_3$ (Almatis, >99.8%) and yttria-stabilized zirconia (8YSZ, UCM Advanced Ceramics). 70 vol % α-$Al_2O_3$ and 30 vol % YSZ were ball-milled with a dispersant (Phospholan PS-236, Akzo Nobel), solvents (MEK/Ethanol), a plasticizer (benzyl butyl phthalate, Aldrich) and a binder (Butvar® B-79) to make a slurry. After the slurry was cast into thin sheets (~125 µm), the sheets were laminated and laser-cut to circular discs. The discs were fired at 1600° C. in air to achieve full density (>99%). The sintered α-$Al_2O_3$/YSZ discs were then placed in a loose β"-$Al_2O_3$ powder and heat-treated at 1450° C. in air in order to convert α-$Al_2O_3$ into β"-$Al_2O_3$. The conversion occurred by a coupled transport of sodium and oxygen ions from the β"-$Al_2O_3$ powder to the samples. The β"-$Al_2O_3$ powder used for the conversion process was synthesized using boehmite, $Na_2CO_3$ and $Li_2CO_3$ via a solid-state reaction. The thickness of the converted composite β"-$Al_2O_3$/YSZ discs was ~600 µm.

In a first example, a hybrid Na—S/$NiCl_2$ cell employed a cathode comprising a mixture of Ni, NaCl and $Na_2S$ as the active materials and $NaAlCl_4$ as the catholyte. This cell retains most of the advantages of the state-of-the-art Na—S and ZEBRA batteries while overcoming the deficits previously discussed. The addition of $NaAlCl_4$ catholyte allows for lower operating temperatures compared to traditional Na—S battery while retaining the benign failure mode inherent to the ZEBRA chemistry. Another feature is that the mixed chemistry exhibits higher energy density than traditional Na—S chemistry. The improvement in capacity appears to be a result of increased oxidation of sulfur that can form solid $Na_2S_n$ with n<3 with the presence of $NaAlCl_4$ catholyte. It is unlike that of traditional Na—S battery, in which discharge can halt with the formation of solids such as $Na_2S_3$. During cycling, two reversible plateaus were observed in cell voltage profiles, which matched electrochemical reactions for Na—S and Na—$NiCl_2$ redox couples. In some instances, an irreversible reaction between sulfur species and Ni was identified during initial charge at 280° C., which led to a decrease in cell capacity. Despite the initial drop in cell capacity, the hybrid cathode demonstrated relatively stable cycling with more than 95% of capacity retained over 60 cycles under 10 mA/cm².

A BASE disc with the diameter of 26 mm was glass-sealed to an $\alpha$-$Al_2O_3$ ring and the cell active cell area was 3 cm². The cell assembly was then moved into a glove box with 1 g of cathode powders consisting of $Na_2S$, NaCl, Ni and small amounts of additives. The mole ratio between $Na_2S$ and NaCl was 1:2. After the powders were dried at 200° C. under vacuum to remove all traces of moisture, $NaAlCl_4$ melt was infiltrated into the cathode. A foil and a spring made of Mo were placed on the top of the cathode as a current collector. A spring-loaded stainless steel shim, which served as a molten sodium reservoir, was inserted into the anode compartment. Anode and cathode end plates were then compression-sealed to both sides of $\alpha$-$Al_2O_3$ ring using gold o-rings. Nickel leads, which served as current collectors, were welded to the electrode end plates.

The assembled cells were heated in air to 280° C. The galvanostatic charge/discharge test was carried out with a BT-2000 Arbin Battery Testing system. The cells were initially charged up to 2.8V under a current of 10 mA. The cells were then discharged back to 80% of the charge capacity using the same current. After the initial charge/discharge, the cells were cycled under the current of 30 mA to test the performance stability. The voltage limits of 2.8 and 1.8 V were applied to avoid overcharging and overdischarging, respectively. After cell testing, several cell cathodes were analyzed using room temperature powder XRD. The cathode samples were crushed and ground to obtain fine-grained powders for XRD analysis. The measurement was carried out in the 2θ range of 20-80° with Cu Kα radiation.

Figure 2:
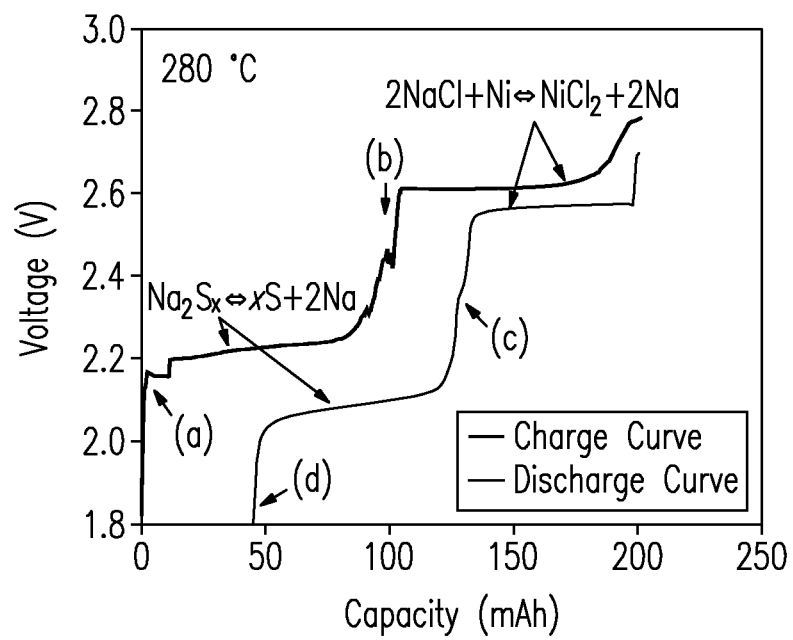
FIG. 2 is a graph of the initial charge and discharge curves of a hybrid Na—S/$NiCl_2$ cell at 280° C. according to embodiments of the present invention.

FIG. 2 shows the initial charge and discharge curves of the hybrid Na—S/$NiCl_2$ cell at 280° C. Two plateaus were observed in the curves below the cut-off voltage of 2.8 V, indicating two separate steps for cell reactions. This is unlike traditional ZEBRA chemistry, in which there is only one plateau due to reaction between Ni and NaCl. As seen in FIG. 2, the open-circuit voltages (OCVs) of the two separate plateaus were around 2.15 and 2.58 V vs Na, respectively. These values correspond to the OCVs of Na—S and Na—$NiCl_2$ batteries at 300° C., indicating co-existence of the two chemistries.

Figure 3:
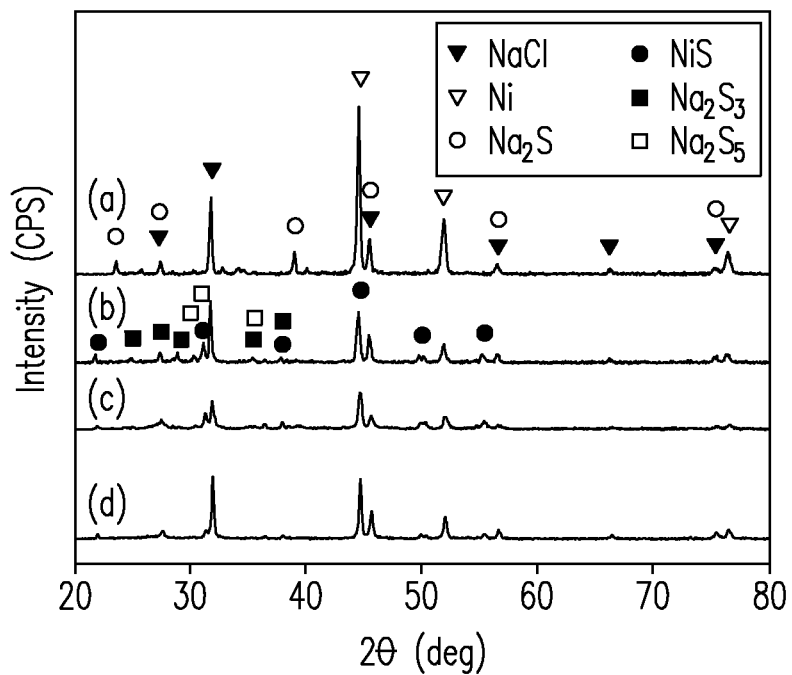
FIGS. 3A-3D include X-ray diffraction (XRD) patterns of a hybrid Na—S/$NiCl_2$ cell at (A) zero and (B) one-hundred percent state of charge (SOC) as well as (C) zero and (D) 100% depth of discharge (DOD) for Na—S portions of the cathode according to embodiments of the present invention.

To verify the assumption, cathode materials before and after various charged/discharged states were analyzed using XRD, as shown in FIG. 3. The diffraction pattern before initial charge shows peaks from $Na_2S$, NaCl and Ni (FIG. 3A). During the first step of charge, the peaks for $Na_2S$ disappeared while those for $Na_2S_3$ and $Na_2S_5$ were observed, as seen in FIG. 3B, confirming that the first step of charge was due to the electrochemical oxidation of $Na_2S$ to sodium polysulfides with lower-valence sulfur. From FIG. 3B, the reaction products during the charge state were $Na_2S_3$ and $Na_2S_5$. The data also suggest the absence of elemental sulfur. However, this does not account for amorphous forms of sulfur. FIG. 3B also shows the presence of NiS, which was likely due the chemical reaction between Ni and sulfur species. NiS appeared to be stable in the cathode at following discharge as the peaks of NiS were clearly visible at the start (FIG. 3C) and end (FIG. 3D) of sodium polysulfide reduction reactions. The formation of NiS from this irreversible reaction can cause a reduction of active materials involved into the electrochemical reactions, and is not preferred. During discharging, peaks for $Na_2S_3$ and $Na_2S_5$ disappeared while those for $Na_2S$ were not observed, which indicated that the polysufides reacted with sodium ion to form $S_x^{2-}$ with x<3. Accordingly, the electrochemical cell reactions were proposed as follows:

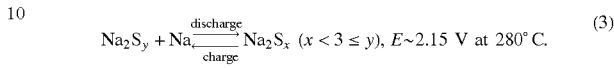

$$Na_2S_y + Na \underset{\text{charge}}{\overset{\text{discharge}}{\rightleftharpoons}} Na_2S_x \quad (x < 3 \leq y), \, E \sim 2.15 \text{ V at } 280°C. \qquad (3)$$

The reversibility of polysulfides is significantly different from the traditional Na—S chemistry, in which discharge capacity is typically limited to the formation of $Na_2S_3$. Further discharging leads to the formation of high melting solid species such as $Na_2S_2$ and consequently increased resistance in the cathode. In the embodiments described herein, molten $NaAlCl_4$ was maintained at the solid electrolyte/electrode interface for rapid ion and mass transport so that solid species such as $Na_2S_x$ with x<3 were formed during discharge, according to Reaction (3).

Figure 4A:
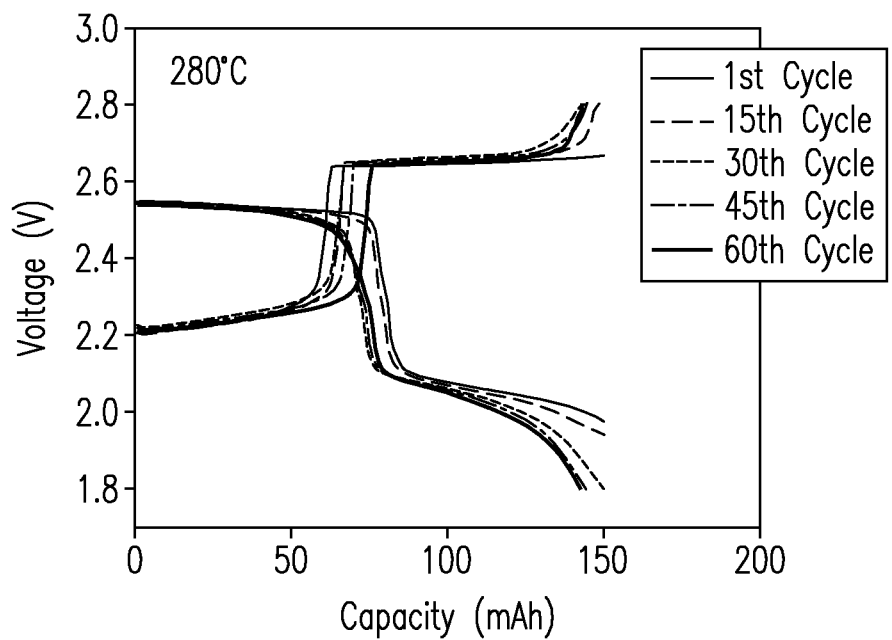
FIGS. 4A-4C include graphs of (A) cell voltage profiles during $1^{st}$, $15^{th}$, $30^{th}$, $45^{th}$ and $60^{th}$ cycles at 280° C.; (B) cell charge/discharge capacity versus cycle numbers at 280° C.; and (C) cell charge/discharge energy density and coulombic efficiency versus cycle numbers 280° C. for a hybrid Na—S/$NiCl_2$ cell according to embodiments of the present invention.
Figure 4B:
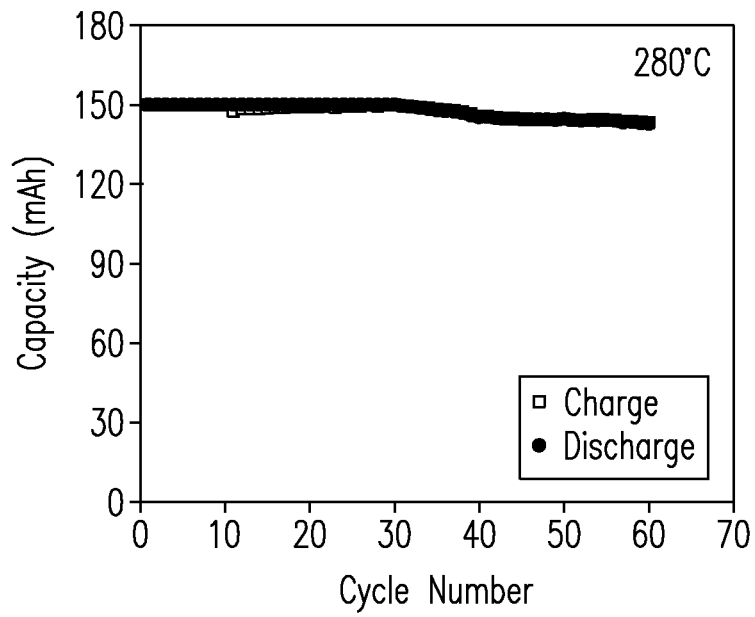

As mentioned elsewhere herein, capacity losses can be observed during the initial charge and discharge of the hybrid cathode cell. These losses might be attributed to side reaction between sulfur and Ni, which eventually could impact performance and cycle life. However, unexpectedly, cycle stability is at least comparable with some state-of-the-art devices. The hybrid Na—S/$NiCl_2$ cells were cycled at C/5 rate (30 mA) with a capacity of 150 mAh. Cell voltage profiles of the $1^{st}$, $15^{th}$, $30^{th}$, $45^{th}$ and $60^{th}$ cycles are shown in FIG. 4A. The cell voltage at the start of the two redox plateaus was stable during cycling for both charge and discharge, while changes in voltage were observed for the end-of-charge and discharge voltage for the Na—$NiCl_2$ couple. FIG. 4A shows that the end-of-charge and discharge voltage reached cut-off limits of 2.8 and 1.8 V for the $15^{th}$ and $30^{th}$ cycles, respectively. Once the voltage limits were reached, the cell was not able to cycle at 150 mAh and cell capacity fade occurred. As showed in FIG. 4B, the full charge and discharge capacity of 150 mAh was maintained during the initial 10~15 cycles and cell performance began to degrade afterwards. Overall, this hybrid cathode cell showed acceptable stability over 60 cycles with a capacity fade rate of 5%. Stability exceeds other Na—S batteries owing to the ceramic membrane electrolyte that can fully block inter-diffusion and side reactions between sulfur species and sodium I the anode. Charge and discharge capacity were calculated from FIG. 4A and are listed in Table 1 below.

TABLE 1

Charge and discharge capacity for Na—$NiCl_2$ and Na—S portions of a hybrid Na—S/$NiCl_2$ cell during cycling.

| | Na—S<br>Charge/discharge | Na—$NiCl_2$<br>Charge/discharge |
|---|---|---|
| $1^{st}$ cycle | 60/71 | 90/79 |
| $15^{th}$ cycle | 63/72 | 87.5/78 |
| $30^{th}$ cycle | 62.5/73 | 81.5/71 |
| $45^{th}$ cycle | 67/73 | 77/71 |
| $60^{th}$ cycle | 74/73 | 70/71 |

Unit: mAh

Figure 4C:
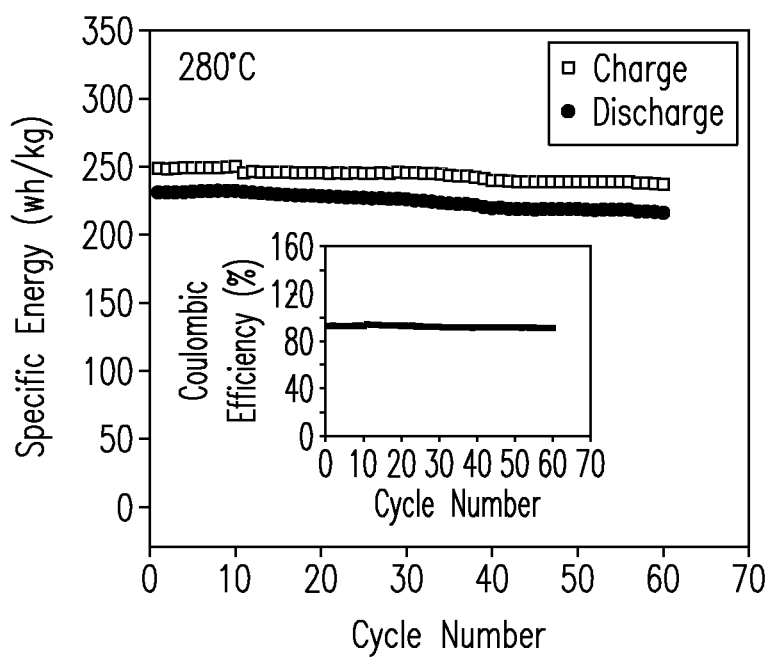

The charge capacity of Na—NiCl$_2$ portion of the cell was much higher than that of Na—S counterpart during the first cycle at C/5 rate, which was unlike that at low rates during initial cycles (FIG. 2). However, the capacity of Na—S portion continuously increased from 60 to 74 mAh during 60 cycles, suggesting that the sodium polysulfides became more accessible in the electrochemical reactions. A similar trend was observed during discharge. FIG. 4C shows the specific energy of the hybrid Na—S/NiCl$_2$ cell as a function of cycling. The initial charge and discharge energy was 248 and 230 Wh/kg (per cathode and anode), and 95 and 97.8% of the energy was retained after 60 cycles, respectively. The energy efficiency as a function of cycle is also shown in FIG. 4C and is greater than 90%. The energy density of the hybrid Na—S/NiCl$_2$ cell was higher than that of a pure Na—NiCl$_2$ battery (150~200 Wh/kg) under similar conditions. Optimization of this mixed chemistry can further improve the performance.

In another example, a cell employed a cathode comprising Na$_2$S as substantially 100% of the active material with Ni as the conducting material. Ni was not necessary and other conducting materials can be suitable. NaAlCl$_4$ was selected as the catholyte. During cycling of the instant Na—S/NaAlCl$_4$ cell, only one reversible plateau was observed in cell voltage profiles, which was attributed to the electrochemical reactions for the Na—S redox couple. Similar to the hybrid Na—S/NiCl$_2$ cell, irreversible reactions between sulfur species and Ni can be observed during initial charge, which can lead to a decrease in cell capacity compared to the theoretical value. Accordingly, other conductive materials can be utilized.

The Na—S/NaAlCl$_4$ cell with pure Na$_2$S cathode was fabricated, assembled and tested using techniques similar to those of hybrid Na—S/NiCl$_2$ cell. The difference being that the cathode was fabricated with 0.7 g of powder comprising Na$_2$S and Ni as the active species and the conductive material, respectively. There was no NaCl added into the cathode.

Figure 5:
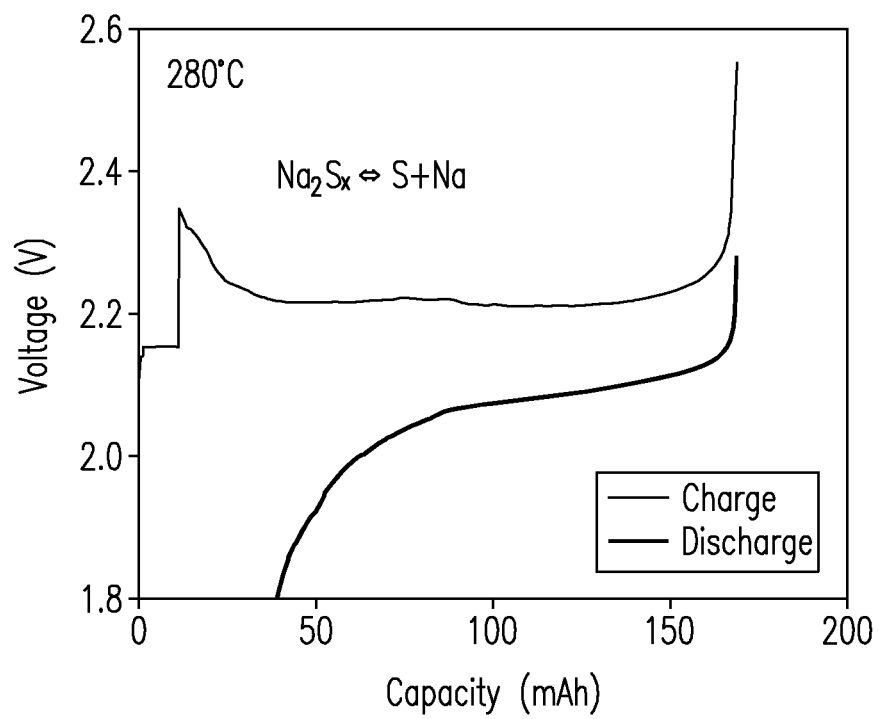
FIG. 5 includes a graph of initial charge and discharge curves for a Na—S/$NaAlCl_4$ cell according to embodiments of the present invention.

FIG. 5 shows the initial charge and discharge curves of the Na—S/NaAlCl$_4$ cell at 280° C. Only one plateau was observed in the curves below the cut-off voltage of 2.55 V. The voltage profiles were quite similar to the Na—S couple in the hybrid system, indicating the plateau was due to the electrochemical redox reactions from sulfur species.

Figure 6A:
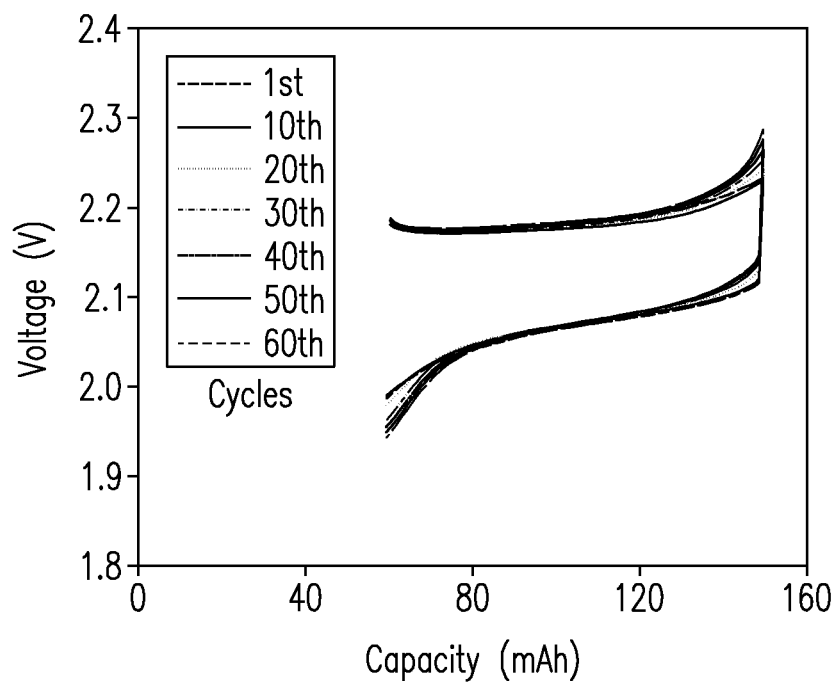
FIGS. 6A-6C include graphs of (A) cell voltage profiles during $1^{st}$, $10^{th}$, $20^{th}$, $30^{th}$, $40^{th}$, $50^{th}$, and $60^{th}$ cycles at 280° C.; (B) End-of-charge and end-of-discharge voltage during cycling at 280° C.; and (C) Cell charge/discharge capacity during cycling at 280° C. for a Na—S/$NaAlCl_4$ cell according to embodiments of the present invention.
Figure 6B:
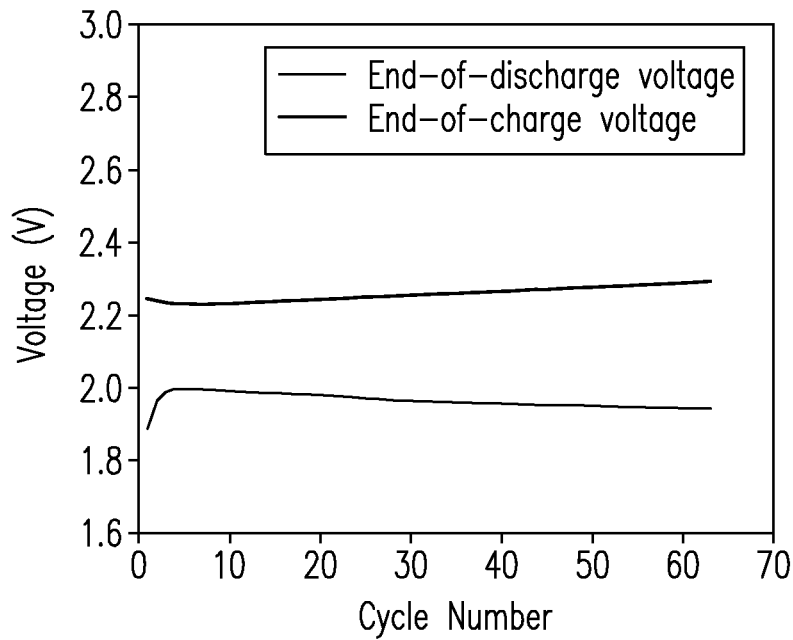
Figure 6C:
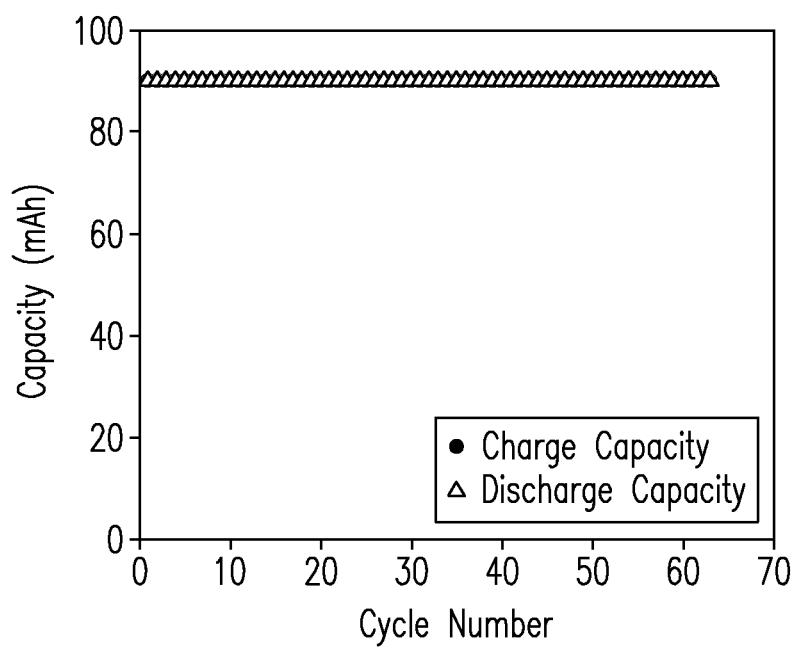

To verify the long-term stability of the Na—S/NaAlCl$_4$ cell, a cell was cycled at C/3 rate (30 mA) with a capacity of 90 mAh. Cell voltage profiles of the $1^{st}$, $10^{th}$, $20^{th}$, $30^{th}$, $40^{th}$, $50^{th}$, and $60^{th}$ cycles are shown in FIG. 6A. It can be seen that end-of-charge and discharge voltage gradually changed during cycling. The end-of-charge and end-of-discharge voltage was plotted in FIG. 6B. The end-of-charge voltage increased and end-of-discharge voltage decreased with time, which was an indication of cell performance degradation over time. FIG. 6C shows the cell charge/discharge capacity during cycling. There was no capacity fade observed during 60 cycles. The more obvious performance fade was observed for the hybrid Na—S/NiCl$_2$ cell, which was due to the wider cycling window and larger cycling capacity in the former. Side reactions between Ni and active material of Na$_2$S were believed to result in the formation of nickel polysulfide species as discussed earlier (see FIG. 3), which can eventually cause cell performance degradation. Accordingly, in some embodiments, the conductive material uses less Ni or does not comprise Ni at all.

TABLE 2

Energy densities of Na—NiCl$_2$ and Na—S batteries compared to that of the hybrid Na—S/NiCl$_2$ and pure Na—S cells described herein.

|  | Traditional Na—NiCl$_2$ battery | Traditional Na—S battery | Hybrid Na—S/NiCl$_2$ battery[a] | Na—S/NaAlCl$_4$ battery |
|---|---|---|---|---|
| Theoretical energy density | 790 | 760[b] | 970[c] | 1250[f] |
| Energy density including catholyte and current collector | ~260[d] | ~760[e] | ~407[d] | ~510[g] |

Unit: Wh/kg
[a]Capacity ratio between Na—NiCl$_2$ and Na—S batteries is 1.
[b]Assuming the final discharging product is molten Na$_2$S$_3$.
[c]Assuming the final discharging product is solid Na$_2$S.
[d]The energy is calculated based on cathode active materials of NaCl and Ni (with Na$_2$S in the hybrid cathode), NaAlCl$_4$ catholyte, and excessive Ni as current collector.
[e]Assuming carbon felt as current collector.
[f]Assuming the final discharging product is solid Na$_2$S.
[g]The energy is calculated based on cathode active materials of Na$_2$S, NaAlCl$_4$ catholyte, and Ni as current collector.

The energy densities for the mixed cathode chemistry of the hybrid Na—S/NiCl$_2$ and Na—S/NaAlCl$_4$ cells are compared with those of traditional Na—NiCl$_2$ and Na—S batteries in Table 2. The theoretical energy densities of the hybrid and Na—S/NaAlCl$_4$ cathode are higher than that of a conventional Na—S battery. As long as the molten catholyte (e.g., NaAlCl$_4$) is maintained in the cathode, the reactants are not limited to molten sodium polysulfides as is typical in conventional Na—S batteries. On the contrary, solid species of Na$_2$S$_x$ with x<3 can be utilized during discharge, which eventually leads to higher theoretical energy density than the traditional Na—S battery. As discussed earlier, the discharging products of embodiments described herein comprises Na$_2$S$_x$ with x<3, indicating that solid polysulfide species participated in the electrochemical reactions.

As shown in Table 2, the energy densities of the two embodiments described above (i.e., the Na—S/NiCl$_2$ and the Na—S/NaAlCl$_4$ cells) are at least 400 Wh/kg. This represents at least a 50% increase in actual energy density over traditional Na—NiCl$_2$ chemistry. The difference in actual and theoretical capacities can be a result of the use of Ni in the cathode to maintain electrical conductivity and the use of NaAlCl$_4$ as catholyte (see Table 2). Accordingly, in some embodiments, various ratios between the cathode active materials (e.g., sulfur-containing material, NaCl and/or transition metal), or between active species, current collector and catholyte can be utilized to improve the energy density of the energy storage device. Furthermore other electrically conductive materials, such as carbon, graphite, graphene, and/or transition metals can be used as a conducting material and/or current collector.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:
1. An energy storage device having a negative electrode comprising sodium, the device characterized by a positive electrode having an active species comprising sulfur, by a catholyte comprising a molten sodium salt, by an energy discharge product comprising Na$_2$S$_x$ in which x is less than three, and by a beta-alumina solid electrolyte (BASE) separating the positive and negative electrodes.

2. The energy storage device of claim 1, wherein the energy discharge product comprises $Na_2S$.

3. The energy storage device of claim 1, further comprising an energy charge product comprising $Na_2S_y$ in which y is greater than or equal to 3.

4. The energy storage device of claim 1, wherein 100% of the active species comprises sulfur.

5. The energy storage device of claim 1, wherein at least 50% of the active species comprises sulfur.

6. The energy storage device of claim 1, wherein at least 10% of the active species comprises sulfur.

7. The energy storage device of claim 1, wherein the active species further comprises a transition metal source and NaCl.

8. The energy storage device of claim 7, wherein the transition metal source comprises an element selected from the group consisting of Ni, Cu, Fe, Zn, Ag, Mn, Co, Ti, and combinations thereof.

9. The energy storage device of claim 7, wherein the transition metal source comprises a metal halide selected from the group consisting of $NiCl_2$, $CuCl_2$, $FeCl_2$, $ZnCl_2$, AgCl, $MnCl_2$, $CoCl_2$, $TiCl_4$, and combinations thereof.

10. The energy storage device of claim 1, wherein the molten sodium salt comprises a compound selected from the group consisting of is selected from the group consisting of sodium polysulfides, sodium metal halides, and combinations thereof.

11. The energy storage device of claim 10, wherein the molten sodium salt comprises $NaAlCl_4$.

12. The energy storage device of claim 1, further having a positive current collector contacting at least a portion of the positive electrode and comprising an electrically conductive material.

13. The energy storage device of claim 12, wherein the electrically conductive material comprises a material selected from the group consisting of carbon, graphite, graphene, transition metals, and combinations thereof.

14. The energy storage device of claim 1, having an operating temperature below 400° C.

15. The energy storage device of claim 1, having an operating temperature below 300° C.

16. An energy storage device having a negative electrode comprising sodium, the device characterized by an operating temperature below 30° C., by a positive electrode having an active species comprising a sulfur source, by a catholyte comprising molten $NaAlCl_4$, by an energy discharge product comprising $Na_2S_x$ in which x is less than three, and by a beta-alumina solid electrolyte (BASE) separating the positive and negative electrodes, wherein at least 50 wt % of the active species comprises sulfur.

17. The energy storage device of claim 16, wherein the energy discharge product comprises $Na_2S$.

18. The energy storage device of claim 16, further comprising an energy charge product comprising $Na_2S_y$ in which y is greater than or equal to 3.

19. The energy storage device of claim 16, wherein the active species comprises a mixture having a $NiCl_2$, the sulfur source, and NaCl.

20. The energy storage device of claim 16, wherein 100% of the active species comprises sulfur.

* * * * *